R. E. SHINER.
PROCESS OF MAKING EMBOSSED FABRIC.
APPLICATION FILED APR. 1, 1920.

1,379,703.  Patented May 31, 1921.

- 6 - Fibrous material
- 5 - Woven material

- 8 - Fibrous material
- 5 - Woven material
- 6 - Fibrous material

- 8 - Fibrous material
- 5 - Woven material
- 6 - Fibrous material

Inventor:
Rose E. Shiner,
by her attorney,
Charles V. Gooding.

UNITED STATES PATENT OFFICE.

ROSE E. SHINER, OF FRANKLIN, MASSACHUSETTS.

PROCESS OF MAKING EMBOSSED FABRIC.

1,379,703.

Specification of Letters Patent.   Patented May 31, 1921.

Application filed April 1, 1920.   Serial No. 370,445.

*To all whom it may concern:*

Be it known that I, ROSE E. SHINER, a citizen of the United States, residing at Franklin, in the county of Norfolk and State of Massachusetts, have invented new and useful Improvements in Processes of Making Embossed Fabric, of which the following is a specification.

This invention relates to an improved process for manufacturing rugs, carpets and the like.

The object of the invention is to provide a process whereby serviceable and beautiful results may be obtained at a very small expense compared with the expense of manufacturing woven rugs and carpets.

The invention consists in the process of manufacturing rugs and carpets as set forth in the following specification and particularly pointed out in the claims. The article produced by said process is made the subject matter of a copending application, Serial No. 370,444.

Referring to the drawings.

Like numerals refer to like parts throughout the several views of the drawings.

Figure 2:
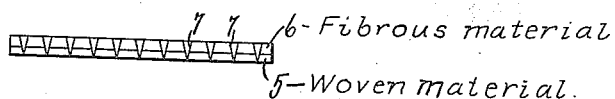
Fig. 2 is a diagrammatic section taken on line 2—2, Fig. 1.

In the drawings, referring to Fig. 2, 5 is a layer of burlap; 6 is a layer of loosely-matted fibrous material, such as jute waste, wool shoddy, silk or animal hair. The fibers 7 of the layer 6 are pricked through into the layer 5 of woven material, such as burlap.

Figure 1:
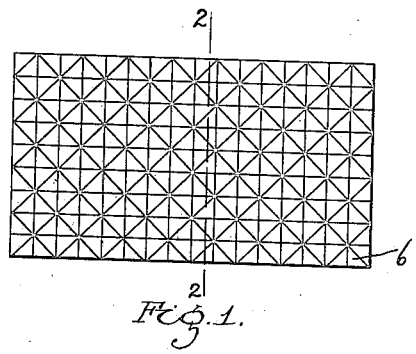
Figure 1 is a plan view of a portion of a rug manufactured by my improved process.
Figure 3:
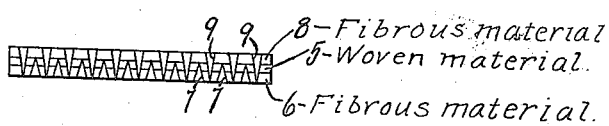
Fig. 3 is a diagrammatic section of a modified form of rug produced by my improved manufacture.

In Fig. 3, the fabric of Fig. 1 is reversed. A layer 8 of loosely-matted fibrous material similar to the layer 6 is placed upon the layer 5 and the fibers 9 of said layer 8 are pricked through the layer 5 and through the layer 6.

Figure 4:
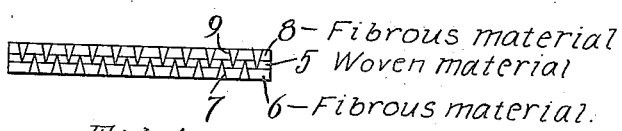
Fig. 4 is a diagrammatic section of another modified form of rug produced by my improved process.

In Fig. 4, the fabric of Fig. 1 has a layer 8 superimposed upon the layer 5 and the fibers 9 of said layer 8 are pricked into the layer 5 but do not extend through the layer 6 as they do in the form illustrated in Fig. 3.

In each of the forms illustrated in Figs. 2, 3 and 4, after the fabric has been constructed as hereinbefore described, it is immersed in casein, glue or waterglass; it is then allowed to dry and then immersed in a solution of formaldehyde, sulfate of aluminum, or alum and allowed to dry. Then the fabric, preferably having been moistened by subjecting it to steam, is embossed upon one or both of its surfaces, as may be desired, by running it between heated rolls under pressure, the heated rolls having their peripheries embossed or the fabric may be embossed by subjecting it to pressure of embossed or engraved heated plates.

The fabric may also be embossed by forming a design from woven wire or cord and said design impressed upon the fabric by subjecting the embossing medium and the fabric to both heat and pressure.

I claim:

1. The herein described process of manufacturing rugs, carpets and the like, which consists in attaching a layer of loosely-matted fibrous material to each of the opposite faces of a layer of woven material by pricking fibers of said fibrous material into said woven material from opposite sides thereof; then immersing said fabric in coagulable adhesive material; then allowing it to dry; then immersing it in a solution of formaldehyde, sulfate of aluminum or alum; and then embossing the same by passing it between heated rolls under pressure.

2. The herein described process of manufacturing rugs, carpets and the like, which consists in attaching a layer of fibrous material to a layer of woven material by pricking the fibers of said fibrous material into said woven material; then immersing said fabric in casein, glue or waterglass; then allowing the same to dry; and then passing said fabric between heated rolls under pressure, said rolls having embossed peripheries.

3. The herein described process of manufacturing rugs, carpets and the like, which consists in attaching a layer of loosely-matted fibrous material to a layer of woven material by pricking fibers of said fibrous material into said woven material; then immersing said fabric in casein, glue or waterglass; then allowing said fabric to dry; then immersing said fabric in a solution of formaldehyde, sulfate of aluminum or alum and allowing said fabric to dry;

and then embossing the surface of said fibrous material by passing said fabric between heated rolls with embossed surfaces and under pressure.

4. The herein described process of manufacturing rugs, carpets and the like, which consists in attaching a layer of loosely-matted fibrous material to a layer of woven material by pricking fibers of said fibrous material into said woven material; then immersing said fabric in casein, glue or water-glass; then allowing said fabric to dry; then immersing said fabric in a solution of formaldehyde, sulfate of aluminum or alum and allowing said fabric to dry; then moistening said fabric by subjecting it to steam and finally embossing the surface of said fibrous material by passing said fabric between heated rolls with embossed surfaces and under pressure.

In testimony whereof I have hereunto set my hand in presence of a subscribing witness.

ROSE E. SHINER.

Witness:
EDGAR C. DEAN.